O. E. BOND AND E. T. EARL.
TRAILER VEHICLE BRAKE.
APPLICATION FILED DEC. 26, 1918.
1,354,947.
Patented Oct. 5, 1920.
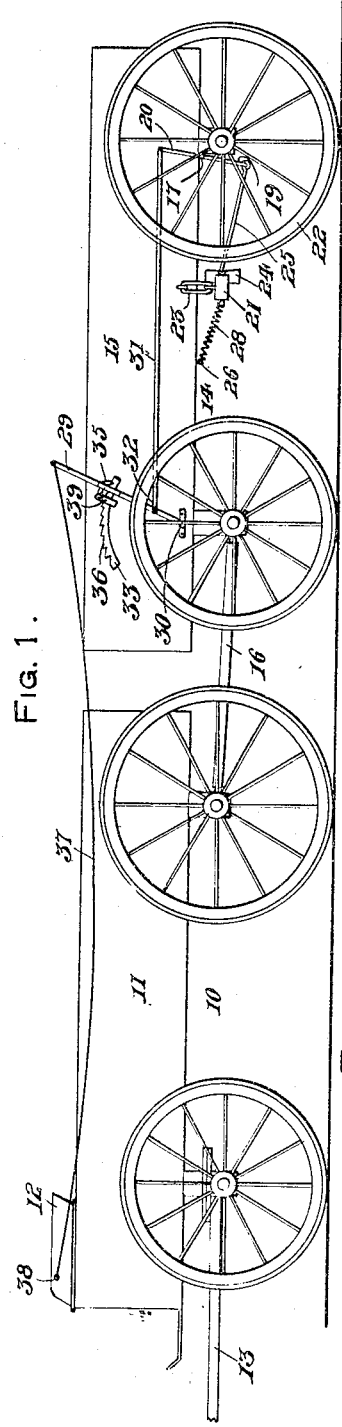
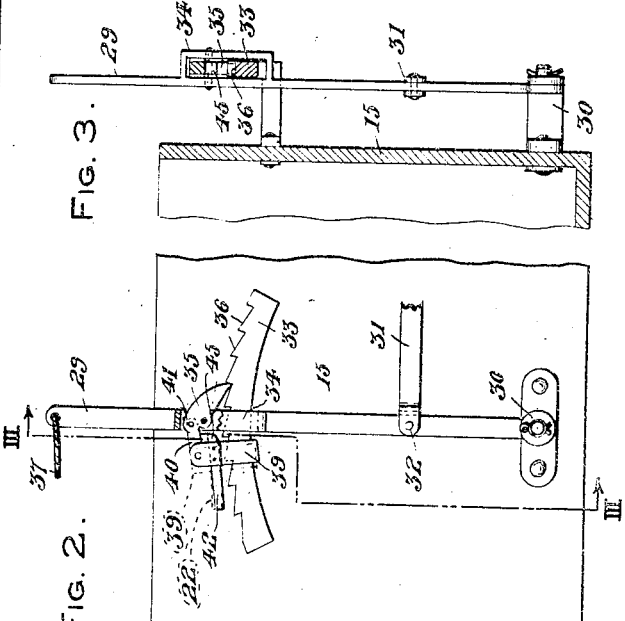
Inventors
Oliver E. Bond
Emmit T. Earl

UNITED STATES PATENT OFFICE.

OLIVER E. BOND AND EMMIT T. EARL, OF ASOTIN, WASHINGTON.

TRAILER-VEHICLE BRAKE.

1,354,947.     Specification of Letters Patent.     Patented Oct. 5, 1920.

Application filed December 26, 1918. Serial No. 268,317.

*To all whom it may concern:*

Be it known that we, OLIVER E. BOND and EMMIT T. EARL, citizens of the United States of America, residing at Asotin, in the county of Asotin and State of Washington, have invented certain new and useful Improvements in Trailer-Vehicle Brakes, of which the following is a specification.

The primary object of the invention is the provision of a brake especially adapted for draft vehicles employed as trailers and largely used in hilly and mountainous territory, the brakes upon the trailers being readily set and released by the driver upon a forward vehicle.

A further object of the invention is to provide a vehicle brake operable at a distant point, such for instance as upon a hauling wagon when my invention is operatively mounted upon a trailer or hauled wagon.

A still further object of the invention is to provide a strong and efficient brake for vehicles that is easy and cheap to manufacture and which is readily applied from a neighboring vehicle while traveling down an incline, the brake being easily released when desired.

With these general objects in view and others that will appear as the nature of the invention is better understood, the same consists in the novel combination and arrangement of parts hereinafter more fully described, illustrated in the accompanying drawing and then claimed.

In the drawing forming a part of this application and in which like reference characters designate corresponding parts throughout the several views, Figure 1 is a side elevation of a vehicle having a trailer wagon attached thereto with our invention operatively mounted upon the trailer wagon adapted for actuation from the forward vehicle;

Fig. 2 is an enlarged elevational view of the brake mechanism illustrated with the brake in its set position and parts broken away;

Fig. 3 is a vertical transverse sectional view taken upon line III—III of Fig. 2;

Fig. 4 is a transverse vertical sectional view through a portion of the wagon box showing a rear portion of the device, and Fig. 5 is a horizontal sectional view showing the same.

Referring more in detail to the drawing, a vehicle 10 is herein illustrated of a form generally employed for hauling commodities such as grain, produce, ore and lumber, the said wagon having a box 11, driver's seat 12 and pole or tongue 13 to which the draft animals are secured. A second vehicle 14 of similar construction and having a wagon box or body 15 serves as a trailer with its tongue 16 secured in any desired manner to the forward vehicle 10. It will be understood that the trailer 14 may be attached at any desired distance rearwardly of the vehicle 10, and that any number of trailers may be employed in a train, the gist of our invention being accurate control of the trailer or trailers by an operator or driver positioned upon the seat 12 of the forward vehicle 10.

A crank-shaft 17 is journaled rearwardly beneath the trailer box 15, preferably upon or adjacent the rear axle 18 thereof and is provided with a substantially central wrist portion 19 and with an upwardly extending operating arm 20 at one side of the wagon 14. A brake beam 21 is swingingly mounted forwardly of the rear wheels 22 of the wagon 14 by means of links 23 attached to the box 15, while shoes or blocks 24 are carried by the beam 21 for engaging the wheels 22 when the beam 21 is moved rearwardly. The axle 18 is centrally cut away as at 43 to accommodate the swinging movements of the wrist 19.

A rod 25 is pivotally connected between the beam 21 and the wrist 19 whereby the said beam is shifted forwardly and rearwardly upon the rearward and forward swinging movement respectively of the arm 20.

The bottom of the wagon box 15 as at 26 is connected by means of a spring 28 with the brake beam 21 tending to forwardly position the beam with the brake shoes 24 released from the wheels 22.

An operating lever 29 is swingingly mounted at one side of the wagon 14 by means of a bracket 30 secured to one side of the box 15. A bar 31 is pivotally connected between the upper free end of the arm 20 and an intermediate point such as 32 of the lever 29 and whereby the swinging of said lever operatively moves the brake beam 21 forwardly and rearwardly.

An arcuate rack 33 is attached to the box 15 with a guide strap or loop 34 of the lever 29 encircling said rack. A pawl 35 is pivoted within the strap 34 adapted for ratcheting over and engaging the teeth of the rack 33, it being understood that the forward movement of the lever 29 sets the brake, and the pawl 35 engaging the teeth 36 of the rack 33 retains the shoes 24 in their set positions until the pawl 35 is released. A rope or cord 37 is secured at one end to the lever 29 with its opposite end attached as at 38 to the seat 12 of the vehicle 10 so that upon pulling the rope 37 by the operator of the vehicle 10, the lever 29 is swung forwardly and the brake shoes 24 frictionally applied to the rear wheels 22 of the trailer 14.

An encircling band 39 is slidably mounted upon the rack 33 pivotally connected by means of a short metallic strip 40 with the adjacent end or heel 41 of the pawl 35. Upon forwardly sliding the band 39, the pawl 35 will be ratcheted over the rack teeth 36, while the dragging of the band 39 frictionally over the rack 33 accomplishes the release of the pawl 35 during the rearward movement of the lever 29 as pulled by the spring 28, when the cord 37 is slackened suddenly after a forward pull.

A finger 42 is rigidly mounted upon the band 39. The rear end 45 of the finger 42 projects from the band 39 above the rack teeth 36 and is provided with a lower curved face for readily passing over the teeth 36 without being retained by the teeth.

The brakes having been applied to the trailer wheels 32 in the manner heretofore described, the pawl 35 is readily released by giving a sudden jerk or forward pull to the cable 43, which elevates the pawl 35 when the lever 29 springs rearwardly. This permits the springs 28 to forwardly move the beam 21 drawing the brake shoes 24 away from the wheels 22 as well as rearwardly shifting the lever 29 to its rest position, as indicated in Fig. 1 of the drawing, ready for use in again resetting the brakes by means of the rope 37. This form of brake possesses great strength and it will be understood that the same may be operatively mounted upon any form of wagon and in different manners from those set forth herein.

While the form of the invention heretofore described is believed to be a preferable embodiment thereof, minor changes may be made therein in proportion, size and form without departing from the spirit and scope of the invention as claimed.

What we claim as new is:—

1. A brake for trailers comprising a swinging brake beam, a lever operatively connected to said beam, a toothed rack upon the trailer, a strap upon said lever encircling said rack, a pawl pivoted within said strap adapted for ratcheting over said rack during the brake-setting operation, a band surrounding said rack forwardly of the lever shiftable longitudinally of the rack, a strip connecting said band with the heel of said pawl, a guide finger secured to said band adjacent the teeth of said rack, and a releasing rope attached to the free end of said lever extending forwardly of the trailer to a distant point of operation adapted for disengaging the pawl during the frictional engagement of the band with the rack when the brake is being released.

2. A brake for trailers comprising a swinging brake beam, a lever operatively connected to said beam, a toothed rack upon the trailer, a strap upon said lever encircling said rack, a pawl pivoted within said strap adapted for ratcheting over said rack, a band surrounding said rack shiftable longitudinally thereof, a strip connecting said band with the heel of said pawl, a finger secured to said band, an operating cord attached to the free end of said lever extending to a point at a distance forwardly thereof, and automatic means attached to the brake beam adapted for returning the lever to its rearward position with the brakes released, the pawl being adapted for release upon a forward jerk upon the cord and subsequent rearward movement of the lever during the dragging of the band frictionally over said rack.

3. A vehicle brake for trailers comprising a frictional member adapted for engaging the rear wheels of the trailer, an operating lever for said frictional member swingingly mounted upon the trailer, a pull rope attached to the upper end of the lever adapted for setting and releasing the brakes, an arcuate toothed rack carried by the trailer with said lever positioned thereon, a guide strap upon the lever encircling the rack, a ratcheting pawl pivoted within the strap adapted for engaging the rack teeth when the brakes are set, a band surrounding said rack pivotally connected to the heel of said pawl adapted for releasing the pawl upon a rearward movement of the lever, a finger secured within the band having a beveled projecting guide portion at its rear end adjacent the teeth of the rack, and a releasing cord for the pawl attached to the upper end of said lever extending to a point adjacent the hauling means for the trailer.

In testimony whereof we affix our signatures.

OLIVER E. BOND.
EMMIT T. EARL.